2,903,720
Patented Sept. 15, 1959

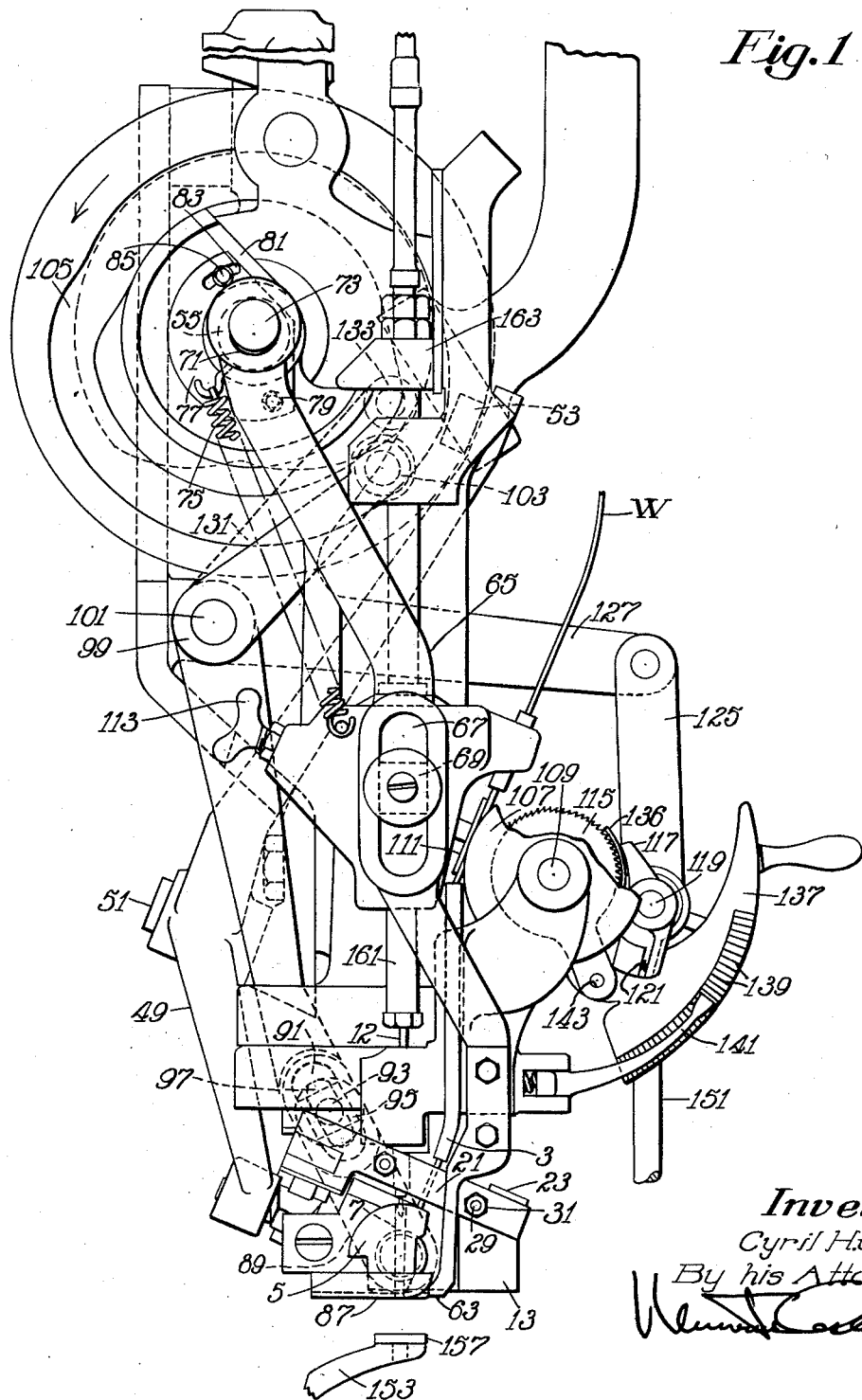

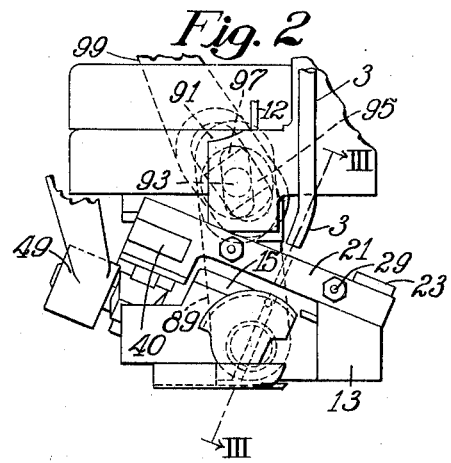
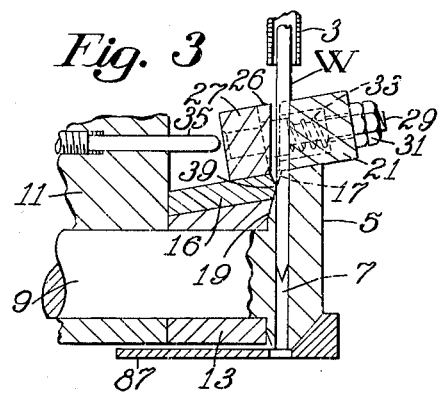
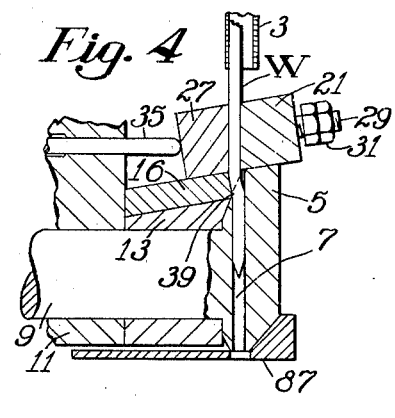
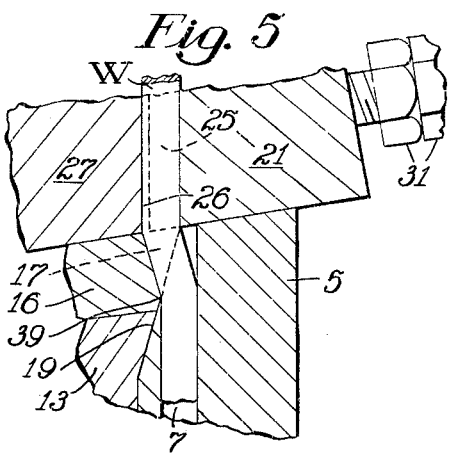
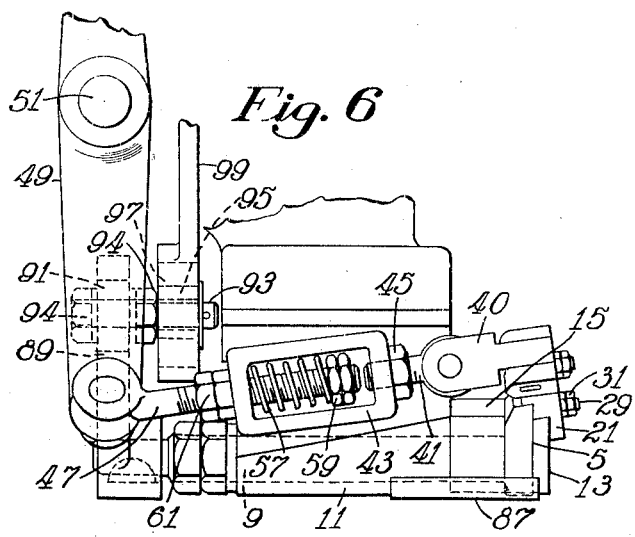
*Inventor*
Cyril H. James
By his Attorney

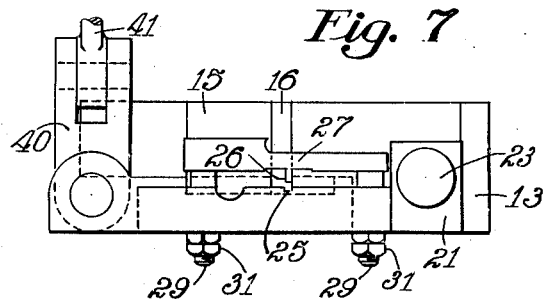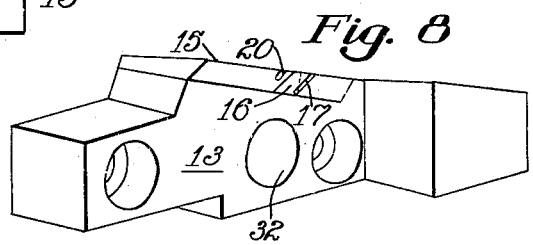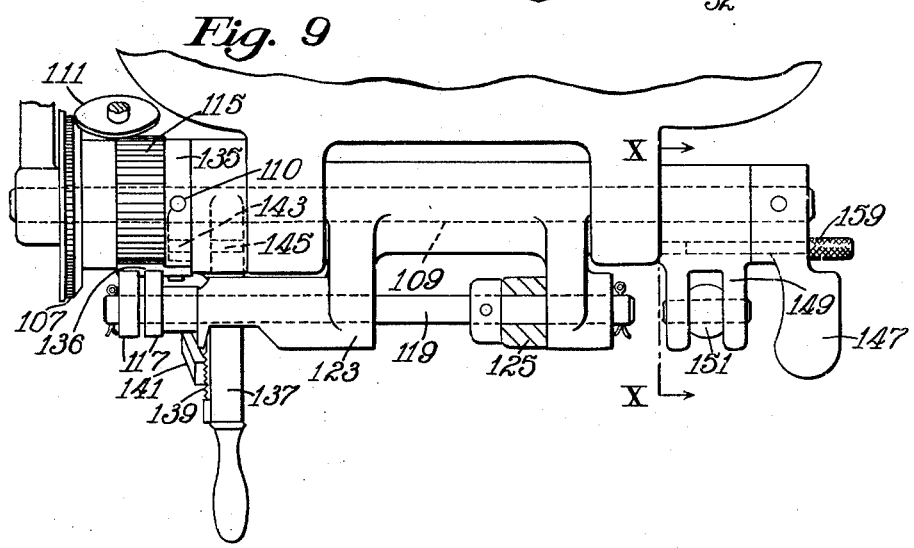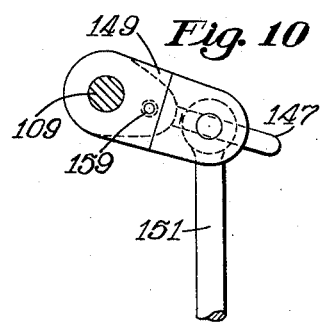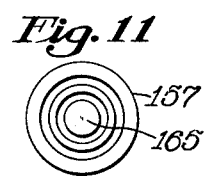
Inventor
Cyril H James
By his Attorney

United States Patent Office

---

2,903,720

METHOD AND APPARATUS FOR CUTTING DOUBLE ENDED NAILS FROM WIRE STOCK

Cyril Harry James, Leicester, England, assignor to United Shoe Machinery Corporation, Flemington, N.J., a corporation of New Jersey Application March 26, 1956, Serial No. 573,939

Claims priority, application Great Britain April 5, 1955

6 Claims. (Cl. 10—54)

This invention relates to improvements in fastening-inserting machines. In particular it relates to a machine for forming headless fasteners from a length of wire strand and for driving the fasteners into a work piece which is supported upon a work entering horn.

A machine of the general type, as that of the present invention, is disclosed in United States Letters Patent No. 2,295,662, issued September 15, 1942 in the name of C. H. James, wherein fasteners are formed by shearing across the length of wire from one side to the other, after which forming operation the fasteners are each driven from the machine into a work piece. The fasteners so formed have at each end a beveled face; the beveled faces, one at either end, being parallel to one another and terminating in points which are disposed, respectively, at opposite sides of the fastener and which are, after being inserted into the work, clenched against the work on opposite sides thereof.

It has been found that when fasteners of this kind are driven into a work piece the beveled face, which forms the leading end of the fastener, is likely to cause the fastener to bend or be deflected as it is being driven into the work piece, consequently the fastener is not always driven straight but is somewhat curved within the work piece.

If the fasteners are not driven straight into the work, the points of a row of fasteners, when driven through the work, may not emerge from the work in alinement with each other and therefore may present an unsightly appearance to the work. Further, if the fasteners assume curved paths in the work, their points may not penetrate far enough through the work to allow both ends of each fastener to be satisfactorily clenched against the work, with the result that parts of the work piece intended to be secured together are likely to become partially separated.

One of the various objects of the present invention is to provide improved means for insuring that headless fasteners, when formed successively from a strand of wire, will not only be driven straight into the work, but that both of their ends will be securely clenched against the work on opposite sides thereof.

In the machine constructed in accordance with the present invention, as hereinafter described, a series of fasteners are successively formed from a length of wire strand having a rectangular cross section, and each fastener so formed has a centrally located point at each end, i.e., the points do not lie at the sides of the fastener but are disposed centrally with respect to the sides of the wire. These points are formed by shearing across the wire strand from one side to the other in such a manner that during the shearing a point is formed on the leading or lower end of wire and a similarly shaped point is simultaneously formed on the upper end of the fastener which, during the shearing, is severed from the wire strand. Each of the points is V-shaped with the apices of the V's extending across the fastener, and the angle between the faces of each V-shaped point is about 30°.

When such fasteners are driven through a work piece their leading V-shaped points insure that each fastener will follow a straight path and that the points which appear on the opposite side of the work will lie in a straight or curved line according to the manner in which the work is guided or fed to the machine. The V-shaped points at both ends of the driven fasteners may be clenched against the work by deflecting or forcing them laterally.

One of the advantageous and novel features of the machine of the present invention is the provision of means for forming a double or reverse bend in a relatively short portion of the wire. This bend is formed in that portion of the wire where the upper pointed end of one fastener (which already has had a point formed on its lower or leading end) is to be formed and where the lower pointed end of the next adjacent fastener is to be simultaneously formed. The formation of the double bend displaces or offsets one portion of the wire laterally with respect to another adjacent portion, and the amount of this displacement is one-half the thickness of the wire. After the wire has been bent to thus offset one portion from the next adjacent portion, a shearing cut is made across the bent portion of the wire to cause the formation of a fastener and to sever it from the rest of the wire strand. The shearing cut is so made that similarly shaped points are formed on the newly formed end of the wire and on the then severed end of the completed fastener. The fastener is then driven into the work.

According to another feature of the invention the machine is provided with wire feeding mechanism for feeding lengths of a wire strand to the wire bending mechanism. Also means are provided by which the operator may manually vary the length of wire feed and thus control manually the length of the fastener to be formed. The machine is also provided with a work supporting horn which presses the work against a fixed hold down member through which the fasteners are driven into the work. The above and other objects and features of the invention will appear from the following detailed description of the preferred embodiment thereof, illustrated in the accompanying drawings and will be pointed out in the claims.

In the drawings,

Fig. 1 is a front elevation of parts of a fastener-inserting machine constructed in accordance with my novel invention;

Fig. 2 is a front elevation of the wire bending and shearing mechanism;

Fig. 3 is a section on the line III—III of Fig. 2 showing a length of wire, sufficient to form a fastener, fed into the wire bending and shearing mechanism;

Fig. 4 is a section similar to that of Fig. 3, but showing the wire after it has been bent;

Fig. 5 is a view, on an enlarged scale, of some of the parts shown in Figs. 3 and 4 to illustrate more clearly the bending and shearing of the wire;

Fig. 6 is a left-hand side elevation of the wire bending and shearing mechanism;

Fig. 7 is a plan view of part of the wire bending and shearing mechanism;

Fig. 8 is a perspective view of a part of the wire bending and shearing mechanism;

Fig. 9 is a plan view of the wire feeding mechanism of the machine;

Fig. 10 is a section on the line X—X of Fig. 9; and

Figs. 11 and 12 are, respectively, a plan view and a section of the horn tip of the machine, shown on an enlarged scale.

The illustrative machine is generally similar to the machine disclosed in United States Letters Patent No. 910,147, issued January 19, 1909 in the name of Frederick H. Perry, and comprises means, similar to those disclosed in said specification, for feeding a length of wire from a coil of wire strand, supported on the machine, to wire shearing mechanism by which a fastener is cut off, then to be driven into a work piece by a driver of the machine.

Referring to the drawings and in particular to Fig. 1, the wire W, which is substantially rectangular in cross section, is fed, down a tube 3 fixed to the machine frame, to the wire bending and shearing mechanism. This mechanism comprises a throat member 5 having a passage 7 through which the wire W and a fastener-inserting driver 12 pass. The throat member 5 has a rearwardly extending stem 9 (Figs. 3 and 4) which is rotatably mounted in a bracket 11 forming a part of the machine frame. The throat 5 is oscillated, from the position of Fig. 2, to shear a fastener from the end of the wire strand and to carry the fastener, to the position of Fig. 1, beneath the driver 12.

The bracket 11 has secured to it a block 13 (Fig. 8) which has a plate 15 affixed to its upper face. The plate 15 is provided with a small hardened block 16 secured in a recess formed in the plate. The block 16, in turn, is provided with a recess 17 formed on its upper forward edge into which recess the wire W may be bent, as shown in Figs. 4 and 5, before the fastener is severed from the wire. The block 16 and throat member 5 each have cooperating shearing edges which, during rotary movement of the throat, sever the wire W. These shearing edges are provided, respectively, by one edge of the recess 17 and one edge of the passage 7 where it leads out of the throat through a conical face 19 formed on the rear or back side of the throat member 5. The conical face 19 is held contiguous against complementary angled faces on the plate 15 and block 16. The plate 15 is provided with a small recess 20 (Fig. 8) through which the driver 12 passes during its driving stroke, and in addition the block 13 is provided with a bore 32 within which the stem 9 of the throat member 5 is oscillatably mounted. The wire W is bent into the recess 17, before being sheared, by a wire bending arm 21 which is pivotally mounted upon a stud 23 set in the block 13. The arm 21 is provided with a groove 25 (Figs. 5 and 7) formed on its rear face through which groove the wire passes downward to the shearing mechanism. The groove 25 is just wide enough to permit the wire to pass freely along it, but its depth is a little less than the thickness of the tire. During the bending and shearing of the wire, the wire is gripped opposite the groove 25 by a forwardly extending projection 26 on a bar 27 which is carried by the bending arm 21. The bar 27 is attached to the arm 21 by a pair of studs 29 secured to the bar and projecting forwardly therefrom and through the bending arm 21. The studs 29, each of which have nuts and lock-nuts 31 on their outer ends, also have an enlarged portion between which and the bending arm 21 compression springs 33 are nested (Fig. 3. These springs normally hold the bending arm separated from the bar 27 so that the wire may pass freely down the groove 25. The nuts 31 may be adjusted to vary the distance apart of the bar 27 and the bending arm 21, to thereby vary the opening between the projection 26 and the forward wall of the groove 25. An abutment stop screw 35 is adjustably mounted in the bracket 11 and has a forward end extending therefrom engageable with the rear face of the bar 27. The screw 35 may be adjusted to bring the front face of the projection 26 into alinement with the upper edge of the rearward face of the recess 17 formed in the hardened block 16. During the operation of the machine the bending arm 21 is swung rearward about its pivot stud 23 causing the length of wire in the groove 25 to be carried with it from the position shown in Fig. 3 to the position shown in Fig. 4. This movement of the wire is equal in extent to half the thickness of the wire and, when the bending arm 21 has been so moved, the length of wire is clamped between the forward wall of the groove 25 and the projection 26. As the bending arm 21 is swung rearwardly, the bar 27 moves with it until the rear of the bar engages the stop screw 35, whereupon the bending arm 21 moves relatively to the bar to clamp the wire. The movement of the bending arm 21 forms a double bend in the wire, as illustrated in Fig. 5, and, while the wire is clamped between the bending arm 21 and the projection 26, the wire is then severed by rotary movement of the throat member 5 in a counterclockwise direction (as viewed in Fig. 2), thereby to displace the bent portion into shearing engagement with the cutting edge of the recess 17 formed in the hardened block 16. The severing cut thus produced extends, as indicated by the dotted lines in Figs. 4 and 5, from the inside of the upper bend in the wire W to the inside of the lower bend, thus providing a V-shaped point on the lower end of the wire strand W and a similar V-shaped point on the upper end of the fastener thus formed. The point on the lower end of the wire strand will provide the point on the lower end of the next fastener which is to be formed.

The conical face 19 on the throat member 5 is disposed at an angle of 15° to the length of the wire lying within the throat; and the rearward wall of the recess 17, against which the wire is pressed during the bending, also lies at an angle of 15° to the length of the wire above the severing block 16. The lateral rearward displacement of the wire is equal to half the thickness of the wire, and the points formed by the shearing cut lie on the median lines of the two parts of the wire which are relatively offset by the bending of the wire, with the result that the points lie centrally of the wire and the faces of the points are equal in length and are disposed at the same angle to the wire.

The upper surfaces of the block 13, i.e., the tops of both the plate 15 and of the block 16, are inclined downwardly and to the rear (Figs. 3 and 4) and at an angle of about 80° to the wire. This downward and rearward inclination of the upper surfaces insures that during the rearward bending of the wire there will be no tendency to withdraw any of the wire already within the passage 7 of the throat member, as might be the case if the upper surface of the plate 15 and block 16 were at right angles to the wire.

The bending arm 21 is pivotally connected, by a link 40, to the front end of a rod 41 (Fig. 6) which has a screw threaded connection with a turnbuckle 43. The rod 41 is locked to the turnbuckle by a nut 45. A second rod 47 is slidingly mounted in the other end portion of the turnbuckle 43. The rear end portion of the rod 47 is pivotally connected to the lower end portion of a cam lever 49. The cam lever 49 is pivoted on a stud 51 (Fig. 1) secured in the machine frame and has on its upper end portion a cam roll 53 which engages a cam groove in a cam secured on a cam shaft 55 rotatably mounted in the machine. The rod 47 is associated with a compression spring 57 which is confined between the inner rear end of the turnbuckle 43 and nuts 59 on the rod. The nuts 59 may be adjusted to vary the force of the spring 57. Also nuts 61 on the rod 47 may be adjusted to vary the initial position of the bending arm 21 about its pivot 23. The spring 57 yields after the bar 27 has engaged the screws 35, thus insuring that the wire is fully bent and firmly gripped between the projection 26 and the forward wall of the groove 25.

In the illustrative machine the work is fed step-by-step by a feed foot 63 (Fig. 1) which engages the upper surface of the work and is secured on the lower end portion of a feed lever 65. The feed lever 65 is provided with a slot 67 which engages a block 69 pivoted on the machine frame. The upper end portion of the feed lever 65 is provided with an oval slot 71 which engages a crank pin 73. A tension spring 75, connected to the feed lever 65 and to the frame of the machine, normally holds the upper end of the slot 71 against the crank pin 73. The crank pin 73 is secured in a block 77 which is pivoted on a stud 79 secured in a cam 81 (corresponding to the cam referred to as the cam 8 in United States Letters Patent 910,147) which raises the driver and allows it to move down to drive a fastener. The block 77 is provided with a slot 83 through which a screw 85, threaded into the cam 81, passes. The screw 85 clamps the block to the cam, and when the screw 85 is loosened, the block may be adjusted about the stud 79 to vary the distance that the crank pin 73 is offset from the axis of the cam shaft 55 and therefore to vary the throw of the crank pin. In this manner the distance that the work is fed during each cycle of the machine may be varied.

During the operation of the machine, the work is supported upon a rotary horn which is adapted to enter a shoe, or other work piece, and which is pressed upwardly by a relatively strong spring (not shown) to hold the work piece up against a fixed holddown plate 87 secured to the frame of the machine. As the crank pin 73 travels downwardly during rotation of the cam shaft 55 the tension spring 75 causes the feed lever 65 to move downwardly with it until the bottom of the feed foot 63 engages the work piece. Thereafter the crank pin 73 moves downwardly in the slot 71 and laterally to feed the work piece. As the crank pin moves upwardly, it reengages the upper end of the slot 71 and thereafter raises the feed lever and feed foot. It will be apparent from the foregoing that the work engaging end of the foot 63 tends to move in a more or less circular path but that the slot 71 allows the foot temporarily to move sidewise in a straight path during the time when the foot is engaging and feeding the work.

The oscillatably mounted stem 9 of the throat member 5 has keyed on its rear end portion an upwardly extending arm 89 (Fig. 6) which is provided with an upwardly and downwardly extending slot 91 (Fig. 1). The arm 89 has a stud 93 adjustably secured to it by nuts 94, 94 (Fig. 6), and the stud 93 has pivotally mounted on it a block 95 which engages a slot 97 in a cam lever 99 which is pivoted on a spindle 101 in the machine frame and carries a cam roll 103 which engages a cam groove 105 in a cam on the cam shaft 55. During rotation of the cam shaft 55 the cam groove 105 causes the throat to move from the position shown in Fig. 2, in which a length of wire is fed into it, to the position shown in Fig. 1 in which the length of wire in the throat has been severed to form a fastener and the fastener lies beneath and in axial alinement with the driver 12. The stud 93 may be adjusted in both slots 91 and 97 to give the correct amount of movement to the throat member 5. The slots 91 and 97 are in alinement when the throat member is in the position shown in Fig. 1 with the passage 7 in the throat in line with the driver 12. The stud 93 may be adjusted in the slots 91 and 97 to insure that the movement imparted to the throat by the cam 105 will bring the passage 7 in the throat into proper alinement with the wire W.

In the illustrative machine the wire W is fed by a rotary wheel 107 (Figs. 1 and 9), similar to the feed wheel designated as 18 in United States Letters Patent 910,147, which is mounted on a spindle 109 rotatably mounted in the machine frame. The wire W is pressed against the feed wheel by a presser wheel 111 which is pressed against the wire by a spring (not shown). The spring may be adjusted by a thumb screw 113 (Fig. 1) in the machine frame. The feed wheel 107 is connected to a ratchet wheel 115 which is arranged to be engaged by one or the other of two pawls 117, the ratchet wheel engaging ends of which are spaced one-half tooth apart along the periphery of the ratchet wheel. The pawls 117 which lie side by side are pivoted on a rod 119 and are pressed against the ratchet wheel 115 by springs, one of which is shown at 121 (Fig. 1). The rod 119 is mounted in a wire feed lever 123 (Fig. 9) which is pivoted on the spindle 109. Pivotally mounted on the spindle 119 is the lower end portion of a link 125 (Fig. 1) the upper end portion of which is pivotally connected to an arm 127 of a cam lever which is pivoted on the aforesaid spindle 101. The cam lever has a second arm 131 which carries at its upper end a cam roll 133 which engages a cam groove in a cam on the cam shaft 55. Secured on the spindle 109, by a pin 110, is a pawl controlling shield 135 (Fig. 9) having secured to it a relatively thin portion 136 extending across a width of the ratchet wheel 115 and arranged to lift the pawls from the ratchet wheel during the return movement of the pawls after they have rotated the ratchet wheel and feed wheel 107 in a direction to cause the wire to be fed. During the wire feeding operation of the machine the pawls 117 are caused to be moved, by the mechanism above described, from above the portion 136 of the shield 135 onto the ratchet teeth and then to cause the ratchet wheel 115 and feed wheel 107 to be rotated to feed the wire. The pawls are moved, during each cycle of the machine, through the same distance about the spindle 109 and, therefore, the distance the ratchet wheel and feed wheel are moved by the pawls, and consequently the length of wire fed, depend upon the distance that the pawls move before they descend from the portion 136 of the shield 135 operatively to engage the ratchet wheel.

The wire feeding mechanism, above described, is generally similar to the wire feeding mechanism of the machine disclosed in United States Letters Patent No. 910,-147. The shield may be adjusted manually by the operator to vary the length of wire fed, and therefore the length of the fastener, by moving a hand lever 137 which is pivotally mounted on the spindle 109. The hand lever 137 is provided with a toothed sector having teeth 139 which are engaged by a spring-pressed detent arm 141, pivotally attached to the machine frame, to hold the hand lever in adjusted position. The hand lever may be connected to the shield 135 by means of a pin inserted through holes 143, 145 (Fig. 9), respectively, in the shield 135 and hand lever 137. When these parts are so connected by the pin the operator may manually vary the length of the wire fed to control the length of the fastener to be formed. In addition to the above provision for manual adjustment of the wire feed mechanism, the spindle 109 has pinned on its rear end portion an arm 147, and pivotally mounted on the spindle 109 is a second arm 149. The second arm 149 has pivotally connected to it the upper end portion of a rod 151 (Fig. 10) the lower end portion of which is connected to a work supporting horn 153 (Fig. 1) which presses the work against the holddown plate 87. The horn has a rotatably mounted tip 157 which supports the work and against which each fastener is clenched. In Fig. 9 the two arms 147, 149 are shown as being connected together by a pin 159 and therefore the position of the shield 135 is controlled by the heightwise position of the horn 153 in accordance with the thickness of the work. If, however, the pin 159 is removed and placed in the aforesaid holes 143, 145 the shield is then connected to the hand lever 137 and the position of the shield may be adjusted thereby, the heightwise position of the horn then having no influence on the positioning of the shield. The arm 147 has on its outer end a hand piece by which the arm may be moved to bring the holes in the arm into alinement with one another for the insertion of the pin 159 therein.

The driver 12 is secured in the lower end portion of a driver bar 161 (Fig. 1) which is slidably mounted in the machine frame. The driver is forced down by a spring (not shown) to drive the fasteners and the driver bar is raised by the aforesaid cam 81. The cam 81 engages a block 163, secured on the driver bar 161, to lift the driver, and later suddenly releases the block to allow the driver bar to be forced down by the spring. The driver has a flat fastener engaging face, and the horn tip 157 (Figs. 11 and 12) preferably has an upper work supporting face which comprises a central circular flat surfaced portion 165. The lower points of the fasteners, when driven through a work piece, engage the center of the flat surface of the central portion 165 and are clenched by being pressed against this flat surface, the upper points of the fasteners being simultaneously clenched by the flat face of the driver.

Having described my invention, what I claim as new and desire to secure by Letters Patent of the United States is:

1. In a fastener forming and inserting machine adapted to produce a succession of fasteners each formed and severed successively from the end of a continuous strand of rectangular wire, the combination of: wire feed means for intermittently advancing the end of said wire a measured amount in a given direction; a movable throat member shiftable between wire receiving position and fastener driving position, said member having a through passageway axially alined, when in wire receiving position, with the direction of wire feed and the walls of said passageway serving to support the length of wire therein against lateral movement; a fixed shearing member having a cutting edge portion contiguously adjacent the entrance of the passageway and provided with a wire receiving recess located to one side of the passageway; wire clamping and bending means operatively disposed in the path of wire feed and engageable with the strand throughout a portion slightly remote from the supported length for producing a reverse double bend in a relatively short portion of the wire strand by displacing a portion of the wire laterally into said recess; and means for moving the throat member to press the bent portion of the wire against the shearing edge to produce a straight faced cut extending from the inside of one bend to the inside of the other bend, and, after thus severing the wire, to shift the completed fastener into driving position.

2. In a fastener forming and inserting machine adapted to form a succession of fasteners, each severed successively from a strand of rectangular wire and each fastener after being severed having at both ends thereof a V-shaped point centrally located midway between two opposite sides of the wire, the combination of: wire shearing means including a pair of cooperating shearing edges operative to shear diagonally through the wire strand successively to sever pointed fasteners therefrom; means for intermittently feeding a measured length of the strand, already provided with a pointed leading end, in a direction so as to locate a relatively short medial strand portion adjacent to the operative zone of the shearing edges; means for supporting a portion of the strand, adjacent the end thereof, against lateral movement; wire clamping and bending means, operative to engage the strand, throughout a portion slightly remote from the supported end portion, after the strand has been fed and before it is severed, for forming, in said short portion, a reverse double bend by displacing the wire laterally to offset from one another those portions of the strand on either side of the shearing means by an amount equal to half the thickness of the wire; and means for operating said shearing means to produce a straight faced cut extending from the inside of one bend to the inside of the other bend; whereby a completed double-pointed fastener is severed from the strand and, at the same time, a V-shaped point is provided on the newly constituted leading end of the strand.

3. In a fastener forming and inserting machine adapted to form a succession of fasteners, each severed successively from a strand of rectangular wire and each fastener after being severed having at both ends thereof a V-shaped point centrally located midway between two opposite sides of the wire, the combination of: means for longitudinally feeding an end of said strand a measured length; means for supporting a portion of the fed strand, adjacent the end thereof, against lateral movement; wire clamping and bending means engageable with the strand throughout a portion slightly remote from said supported length; means for shifting said clamping and bending means a sufficient amount to displace the clamped portion laterally, with respect to the supported length, by an amount equal to one half the thickness of the wire while maintaining the clamped portion in substantial parallelism with the spaced apart supported length, whereby a relatively short intermediate portion of the wire connecting the offset parallel portions is diagonally disposed with respect to the adjacent offset portions so as to form a reverse double bend in the wire; and means for shearing the wire to produce a straight faced cut extending from the inside of one bend to the inside of the other bend.

4. In a fastener forming and inserting machine adapted to form a succession of fasteners, each severed successively from a strand of rectangular wire and each fastener after being severed having at both ends thereof a V-shaped point centrally located midway between two opposite sides of the wire, the combination of: a movable throat member having a passage therethrough for the entry of a length of wire to be formed into a fastener, said member being adapted to support the wire therein against lateral movement; a shearing edge, adapted upon movement of the throat member, to intercept diagonally the entry into said passage; means for intermittently feeding a measured length of strand into said passage; wire clamping and bending means engageable with the strand throughout a portion slightly remote from the length supported within the throat; means for shifting said clamping and bending means a sufficient amount to displace the clamped portion laterally, with respect to the supported length within the throat, by an amount equal to half the thickness of the wire while maintaining the clamped portion in substantial parallelism with the spaced apart supported length, whereby a reverse double bend is formed in a relatively short portion of the wire; and means for moving the throat member to press the bent portion of the wire against the shearing edge to produce a straight faced cut extending from the inside of one bend to the inside of the other bend.

5. A fastener forming and inserting machine of the type referred to, comprising: a pair of cooperating shearing edges operative to shear through a strand of wire to sever double-pointed fasteners successively from the strand; and wire bending means operative, prior to the severing of each fastener from the strand, to impart to that portion of the wire which is about to be cut through by the shearing edges an offset relation relatively to portions of the wire on either side of it, said means including a straight passageway for receiving an end length of the wire and for supporting said length against lateral displacement, wire clamping means engageable with the wire along a portion slightly remote from said passageway and movable in a direction transverse to the axis of the wire, and means for shifting said clamping means to cause the strand to be offset with an intermediate portion thereof in the form of a double reverse bend; the construction and arrangement being such that the shearing edges, in shearing the wire, do so along an oblique line the beginning and end of which lie substantially on the median lines of portions of the wire lying at opposite sides of the intermediate bent portion.

6. That method, for forming a series of fasteners from a continuous strand of rectangular wire, wherein each fastener is provided at both ends with a V-shaped point centrally located midway between two opposite longitudinal sides of the wire, and wherein but a single shearing of the wire is required for the formation of each fastener in the series, which comprises: providing a continuous strand of wire having a V-shaped point already formed at one extremity thereof; supporting a measured length of the wire adjacent said extremity against lateral movement; clamping a portion of the wire slightly remote from said supported length; moving said clamped portion laterally a sufficient amount to displace said portion with respect to the said supported length by an amount equal to half the thickness of the wire while maintaining the axial direction of the clamped portion in substantial parallelism with the axial direction of the supported length, whereby a relatively short intermediate portion of the wire connecting the offset parallel portions is diagonally displaced with respect to said portions so as to form therewith a reverse double bend in the wire; severing the wire with a diagonal straight faced cut extending through said bent portion along an oblique line the beginning and end of which lie substantially on the median lines of the portions of the wire lying at opposite sides of the bent portion, whereby a completed fastener having identical V-shaped points provided at both ends thereof is produced and, at the same time the terminal end of the continuous strand of wire is provided with a similarly shaped point to constitute one pointed end of the next fastener to be generated by subsequent bending and shearing operations.

References Cited in the file of this patent

UNITED STATES PATENTS

| | | |
|---|---|---|
| 350,837 | Newton | Oct. 12, 1886 |
| 2,684,490 | Wright | July 27, 1954 |